Aug. 25, 1931.    E. CHESHIRE    1,820,730
SHEET DELIVERING DEVICE
Original Filed April 30, 1925    12 Sheets-Sheet 7

Inventor
Edward Cheshire
By Charles G. Cooper
Atty.

Aug. 25, 1931.  E. CHESHIRE  1,820,730
SHEET DELIVERING DEVICE
Original Filed April 30, 1925    12 Sheets-Sheet 10

Inventor:
Edward Cheshire
By Charles G. Cooper
Atty.

Aug. 25, 1931.     E. CHESHIRE     1,820,730
SHEET DELIVERING DEVICE
Original Filed April 30, 1925     12 Sheets-Sheet 11
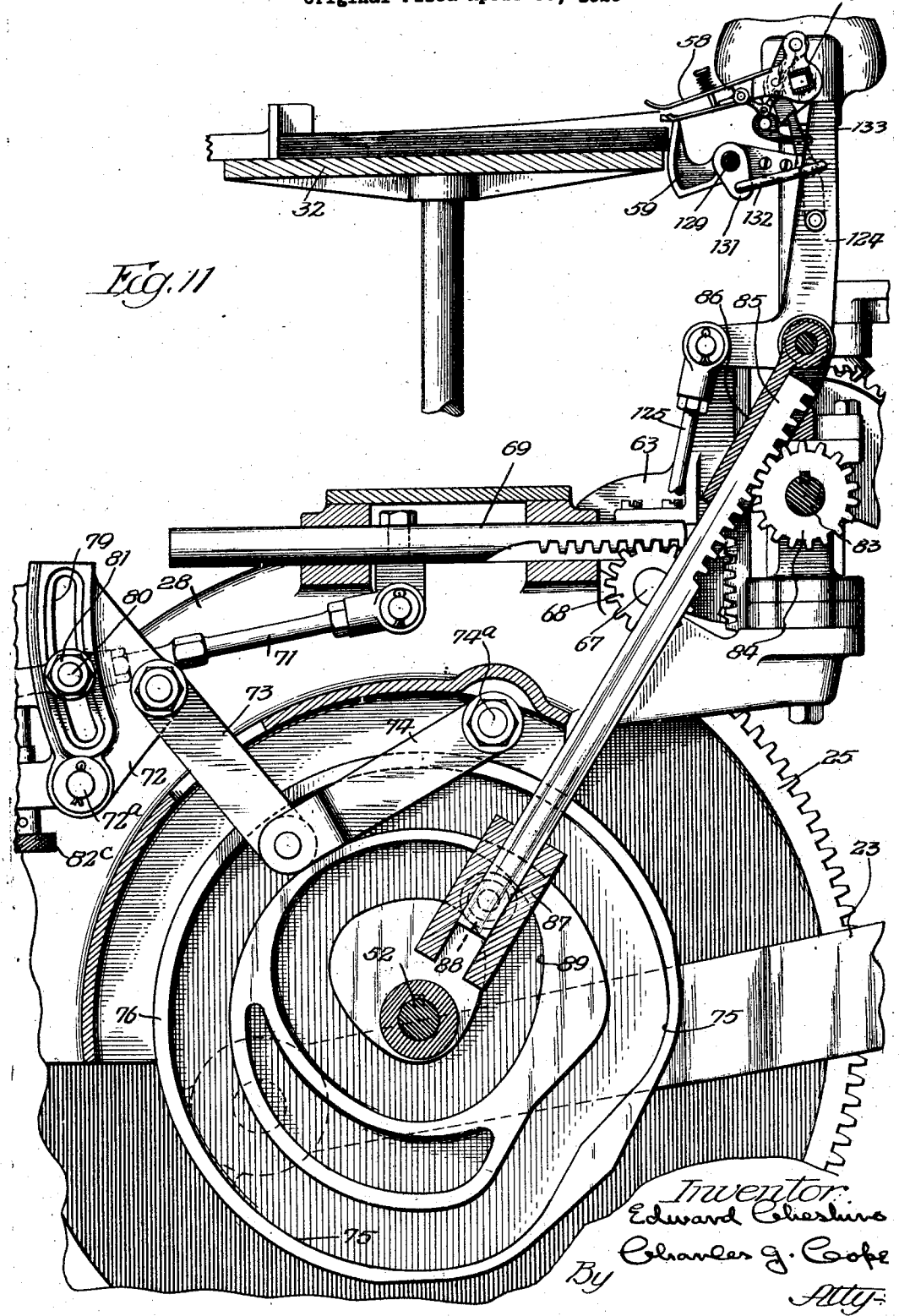

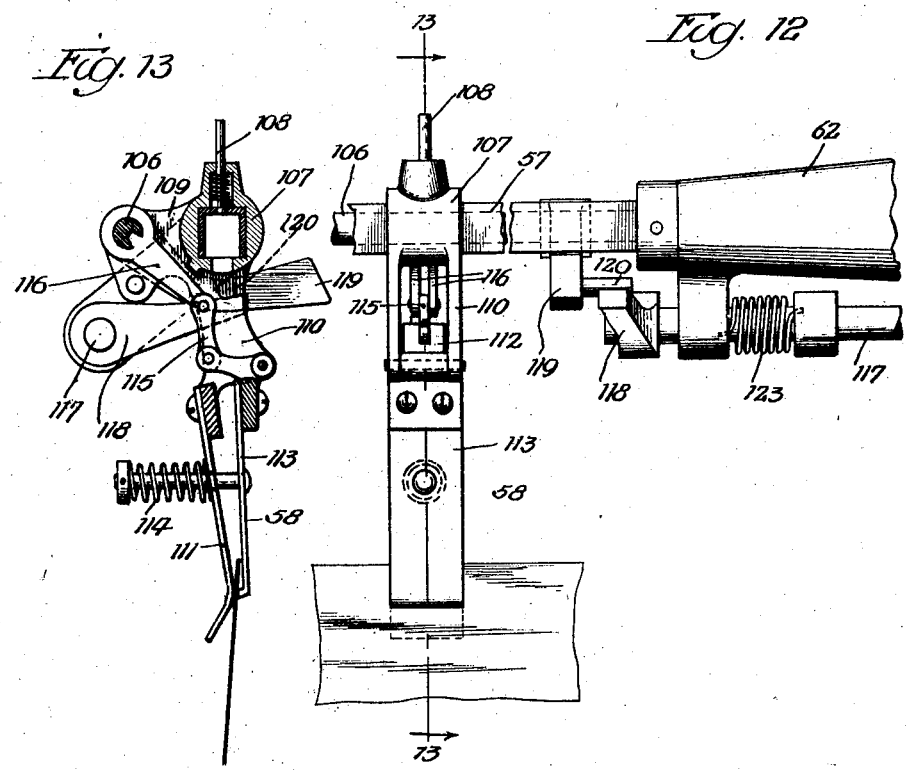
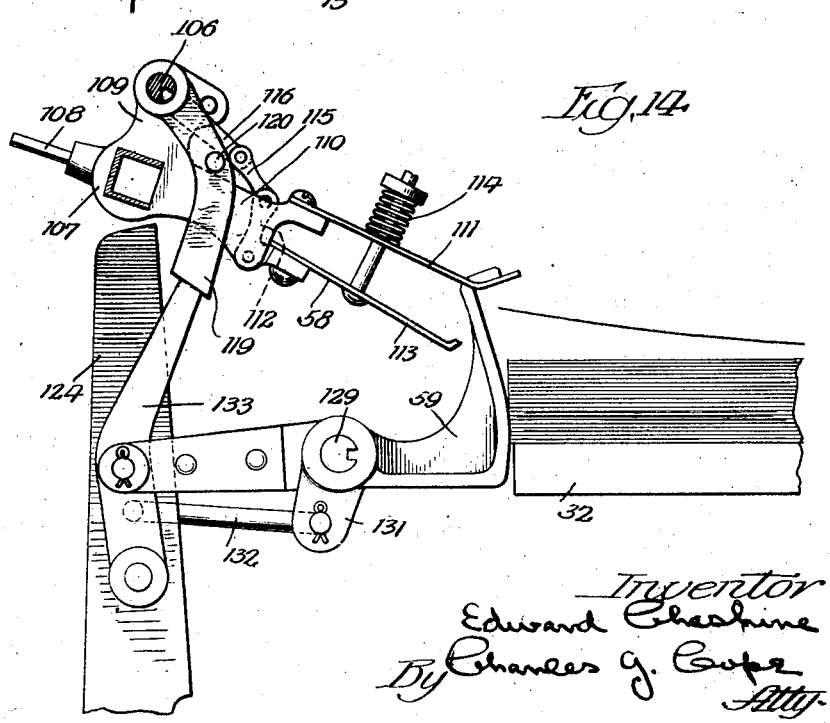

Patented Aug. 25, 1931

1,820,730

UNITED STATES PATENT OFFICE

EDWARD CHESHIRE, OF ST. PETERSBURG, FLORIDA

SHEET DELIVERING DEVICE

Application filed April 30, 1925, Serial No. 26,972. Renewed February 11, 1927.

My invention pertains to sheet delivering devices and relates especially to devices for effecting the delivery of printed sheets from the platen of a platen printing press.

It is an object of my invention to improve upon sheet delivering devices by providing one that will be especially speedy and sure in its actions and particularly accessible and easy for the operator to handle and adjust.

It is another object of my invention to provide a device for delivering sheets from the platen of a platen printing press in which the steps of separating and removing the printed sheet from the platen will be effected with a high degree of certainty, regardless of difficult operating conditions or troubles arising from the nature or peculiarities of the stock being printed.

Other and further objects of my invention will appear from the following specification taken in connection with the claims annexed thereto.

I have described in the following specification, and shown in the accompanying drawings one form of sheet delivering mechanism in which my invention may be embodied. It is shown as used in conjunction with a mechanism for feeding sheets to the platen which is the subject matter of my co-pending application Ser. No. 732,443 filed Aug. 16, 1924 for Sheet feeding devices. I wish it understood, however, that the sheet delivering mechanism of my invention is not limited for use in connection with this particular sheet feeding mechanism, that it may be used otherwise and embodied in different forms than that described and shown, and that changes and modifications may be made in the form herein described, without exceeding the scope of the invention as defined in the appended claims.

Referring now to the drawings.

Figure 9:
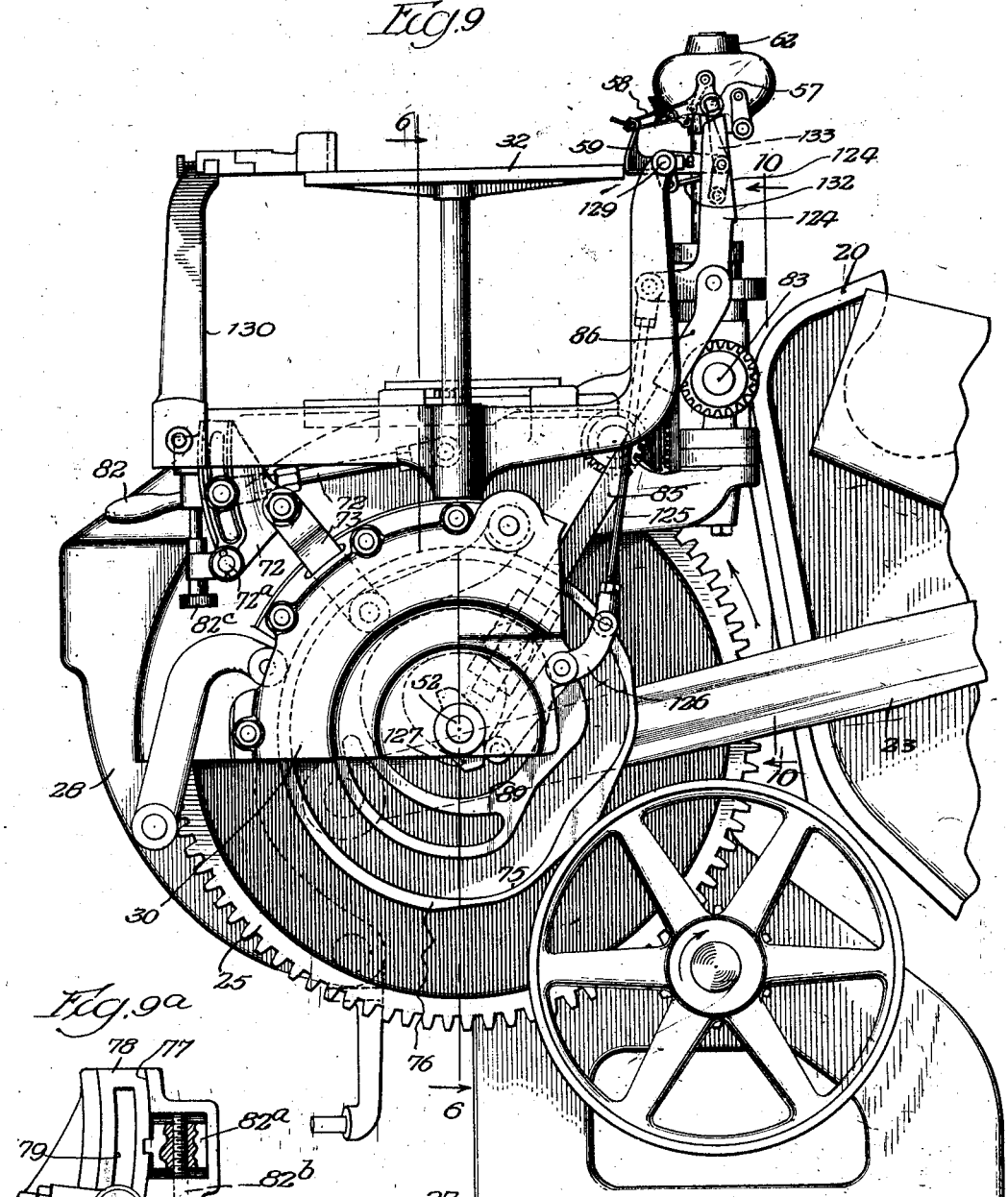
Fig. 9 is a side elevation looking from the right-hand side of the machine.
Figure 10:
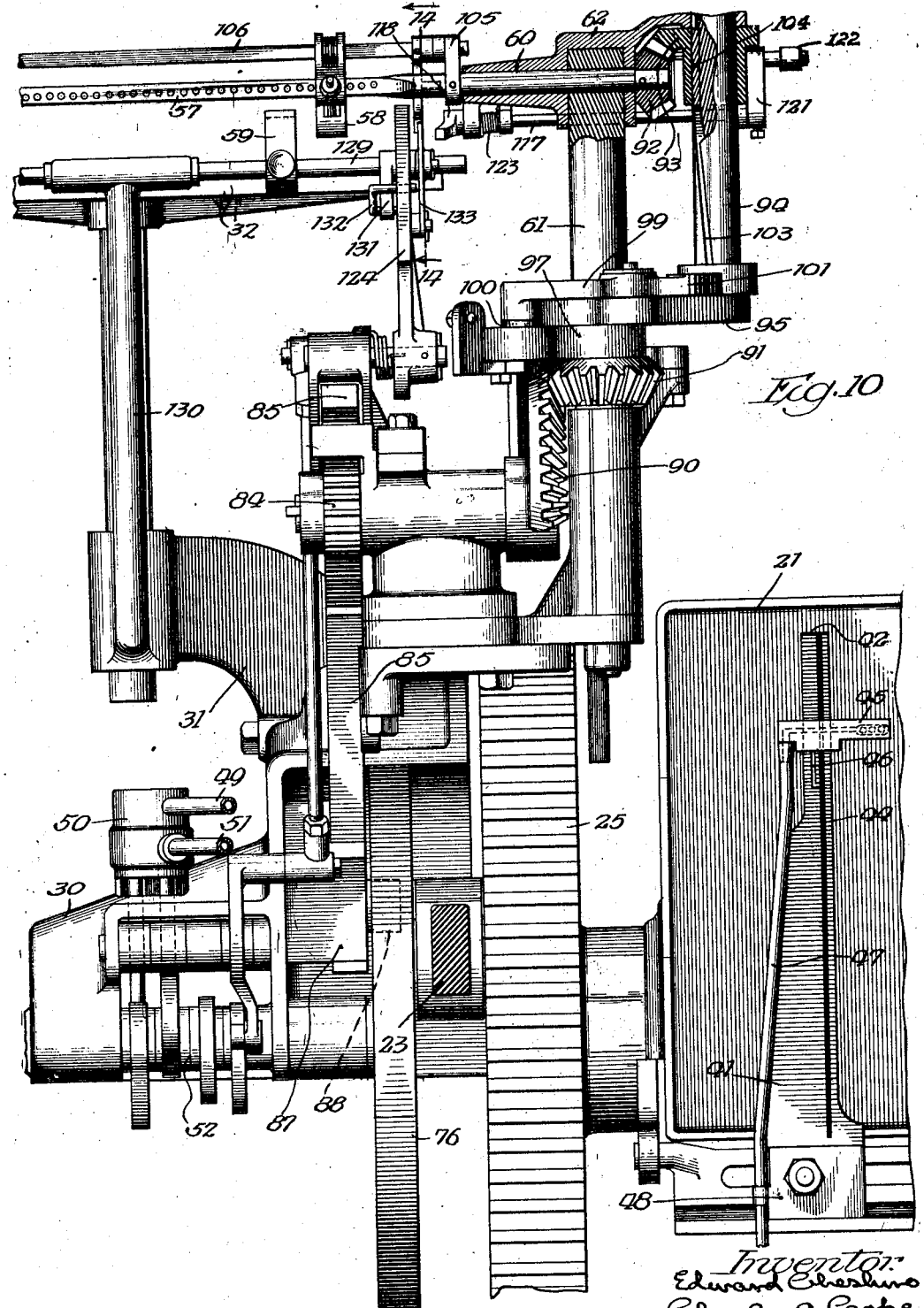

Fig. 9ª is a fragmentary view showing a detail of the means for adjusting the amount of the distance through which the delivering grippers shall descend, in order to seize printed sheets of varying sizes;

Fig. 10 is an enlarged rear view of the delivery mechanism, viewed from a position such as that indicated by the arrow 10, Fig. 9;

Fig. 11 is an enlarged sectional side elevation looking from the right-hand side of the machine and showing the cam-actuated devices for driving the delivery mechanism;

Fig. 12 is an enlarged detail view showing one of the delivery grippers in the position which it assumes when it has just been caused to close upon a printed sheet;

Fig. 13 is a section on the line 13—13 of Fig. 12; and

Fig. 14 is a detail section, on the line 14—14 of Fig. 10, showing the means for actuating the delivery gripper to open the latter when a sheet is to be deposited on the delivery table.

As stated above, a delivery mechanism constructed in accordance with my invention is herein illustrated as applied to a platen press of the Gordon type, and in conjunction with other mechanisms for handling the paper.

The press is of well known character and comprises a pivoted type bed 20 which rocks towards and away from a platen 21. The platen itself rocks from the stationary, nearly horizontal, position shown in Fig. 2, in which it receives the blank sheets to be printed, to the nearly vertical impression position, shown in Fig. 3, in which the type form is forced against it by the bed 20. The rocking movement of the type bed 20 is effected, as usual, by crank arms 22 and 23 which are connected at their rear ends with the bed and at their front ends with a crank disc 24 and bull wheel 25 respectively.

Figure 1:
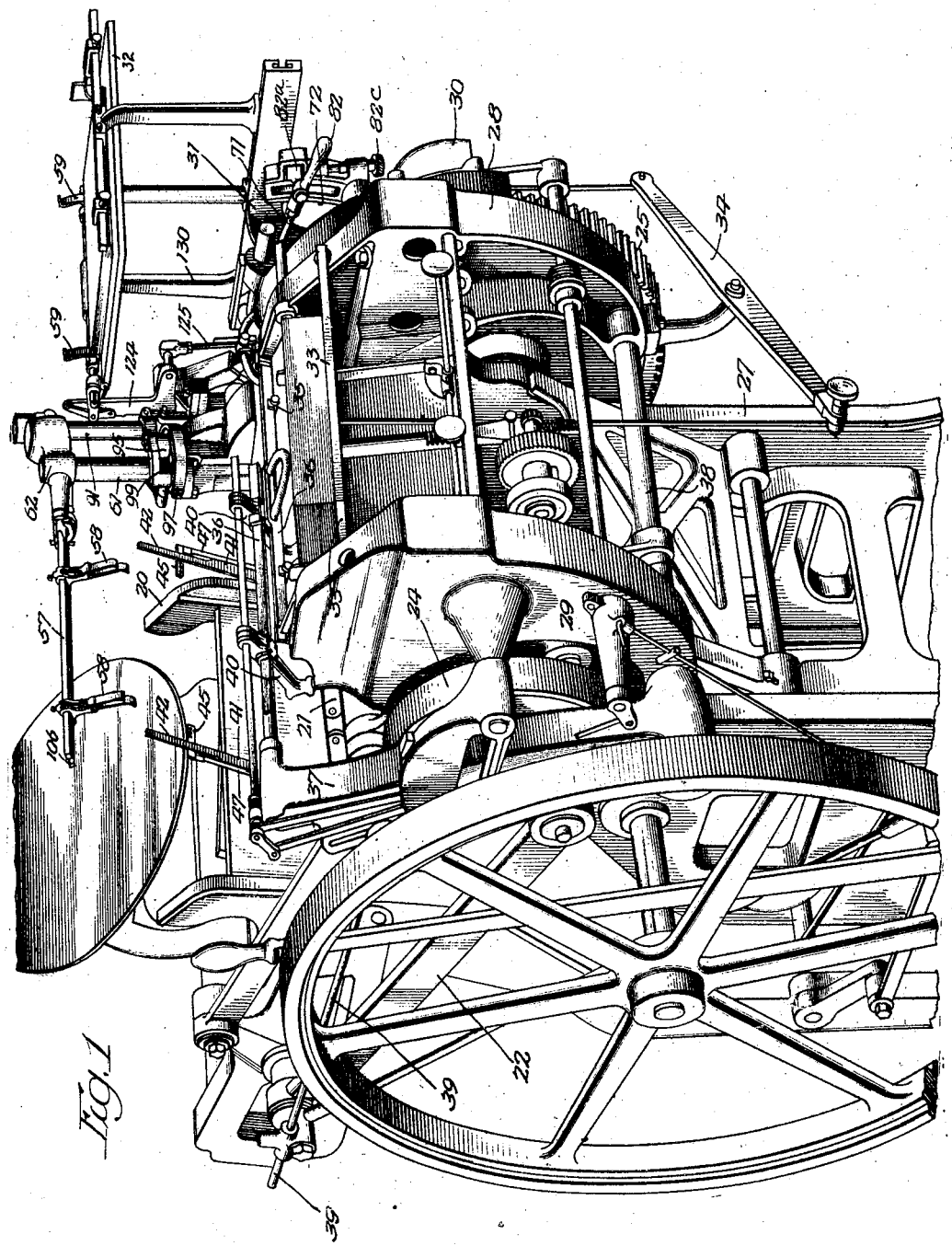
Fig. 1 is a perspective view of a platen press of the Gordon type equipped with a full set of paper feeding and handling mechanism, including a sheet delivery mechanism constructed in accordance with my invention.

Secured to the press frame 27 is a feeder frame which comprises a right-hand side member 28 and a left-hand side member 29, these being secured together by suitable cross members. From the right-hand side frame member 28 extends a cam shaft housing 30 which is provided with a bracket 31, in which the delivery table 32 is mounted. A feed table 33 is disposed between the side frame members 28 and 29 and has automatic mechanism associated therewith for raising it step by step so as to maintain the top of the pile of stock mounted thereon at a constant level in spite of the sheets being continuously fed away to the platen. The feed table 33 is connected with the delivery table 32 by means of a pivoted beam 34 (Fig. 1), so as to cause the delivery table to descend as the feed table rises.

The sheets are separated one by one from the pile of stock carried by the feed table 33 by means of pneumatic separator feet 35 mounted on a rocking separator bar 36. The bar 36 descends so as to bring the feet 35 into contact with the top sheet of the pile, whereupon suction is applied to the feet, causing the top sheet to adhere thereto. When the separator bar 36 rises again the separator feet carry the top sheet up with them and hold the latter in a position ready to be received by the feed grippers.

The separated sheet is fed to the platen by means of the feed mechanism described in my co-pending application Ser. No. 732,443, above referred to. Such mechanism includes a feed arm 37 carried by a rock shaft 38 extending between the side frame members 28 and 29. The feed arm is connected by a link 39 with the pin which connects the left hand crank arm 22 with the type bed 20. In this way the feed arm is caused to swing towards the platen as the bed moves away from printing position, and away from the platen as the bed returns. The feed arm carries mechanical feed grippers 40 which seize the sheet when the feed arm is in its back position (Fig. 7) and, as the feed arm swings forward, carry it out and deposit it on the platen.

The present application relates exclusively to the delivery mechanism,—i. e. to the means for removing the printed sheet from the platen and delivering it to a suitable delivery table or the like. According to my invention, the delivery of the sheet is effected in two steps, the first step consisting in the removal of the printed sheet from the platen and the bringing of it into a convenient position for removal and carrying away to the delivery table or the like. The first step is effected by the platen grippers, the construction being such that these grippers seize the printed sheet and carry it with them when they rise from the platen as the latter opens from the printing position. They hold the sheet suspended upon them in a convenient position for being seized by the carrying-away device.

In the drawings, the platen grippers are indicated at 41. These are of the general type of platen grippers ordinarily provided on platen printing presses, but are preferably of a more rigid material and more substantial construction. The platen grippers are identical on each side of the machine, except as to being left and right, and the devices they carry are the same. Each platen gripper is cut away, at its outside edge, from the top downward, so as to provide a parallel-sided portion 42 which extends from the top of the gripper to a point which will be close to, or below, the center of the platen. Extending along the center of the gripper portions 42 are formed a series of indentations 44. Upon the portion 42 is mounted a suction foot 45, which is adjustable upward and downward on the gripper portion 42 and is maintained in its adjusted positions by a spring finger 46 (Fig. 10) which engages in one or another of the indentations 44. At its inner end, the foot 45 is formed with a suction opening so disposed as to lie upon the printed sheet when the platen gripper is rocked down onto the platen, and, at its outer end, with a nipple for receiving a hose 47. The suction foot is hollow at the part which crosses the gripper portion 42; so that suction applied at the hose 47 will be effective at the inner end of the foot. The hose 47 from each suction foot is carried down along the outside of the gripper, and held in place by means of a clip 48 at the gripper base. Below the platen, the hose 47 is connected to a pipe 49 which connects with the valve 50, which, in turn, is connected by a second pipe 51 with a suction pump. The valve 50 is suitably actuated as by a cam on the shaft 52, so as to apply suction, through the hose 47, to the suction feet 45 just before the platen grippers start to leave the platen after the printing operation, and to maintain suction at the feet 45 until such time as the sheet is removed therefrom, as hereinafter described.

Figure 2:
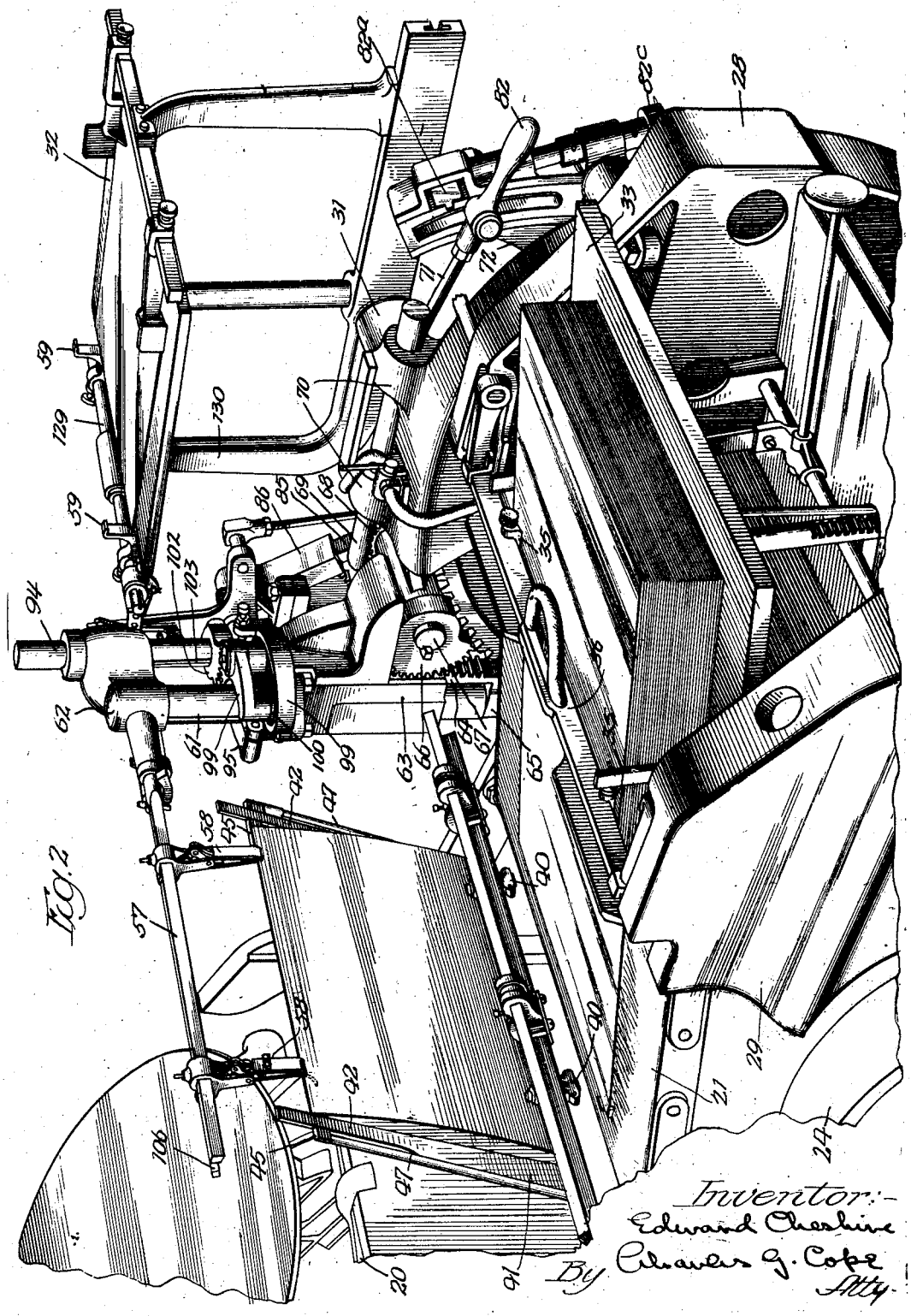
Fig. 2 is an enlarged perspective view of the same general nature as Fig. 1 but confined chiefly to the delivery mechanism and showing the same in a position in which the delivery grippers have just seized a sheet which has been raised from the platen by means of sheet raising members associated with the platen grippers.

The suction feet 45 are so adjusted upon the gripper portions 42, and the grippers 41 are so adjusted towards or away from the center of the platen, that the inner ends of the suction feet will engage the printed sheet, in whatever position it is located upon the platen for the particular job on hand, close to its upper edge and near its sides. In making the adjustment of the suction feet on the gripper portion 42, the hose 47 is slipped in one direction or the other through the clips 48, which hold the hose frictionally. With the suction feet thus positioned, the printed sheet will adhere to them when suction is applied just before the grippers start to leave the platen after the printing operation. As the grippers leave the platen, and swing upward therefrom, the suction feet will carry with them the sheet suspended from its top edge, and will hold the sheet thus suspended when the grippers have completed their upward swinging movement (Fig. 2). The sheet is thus brought into a readily accessible position for being seized by the carrying-away device.

Figure 7:
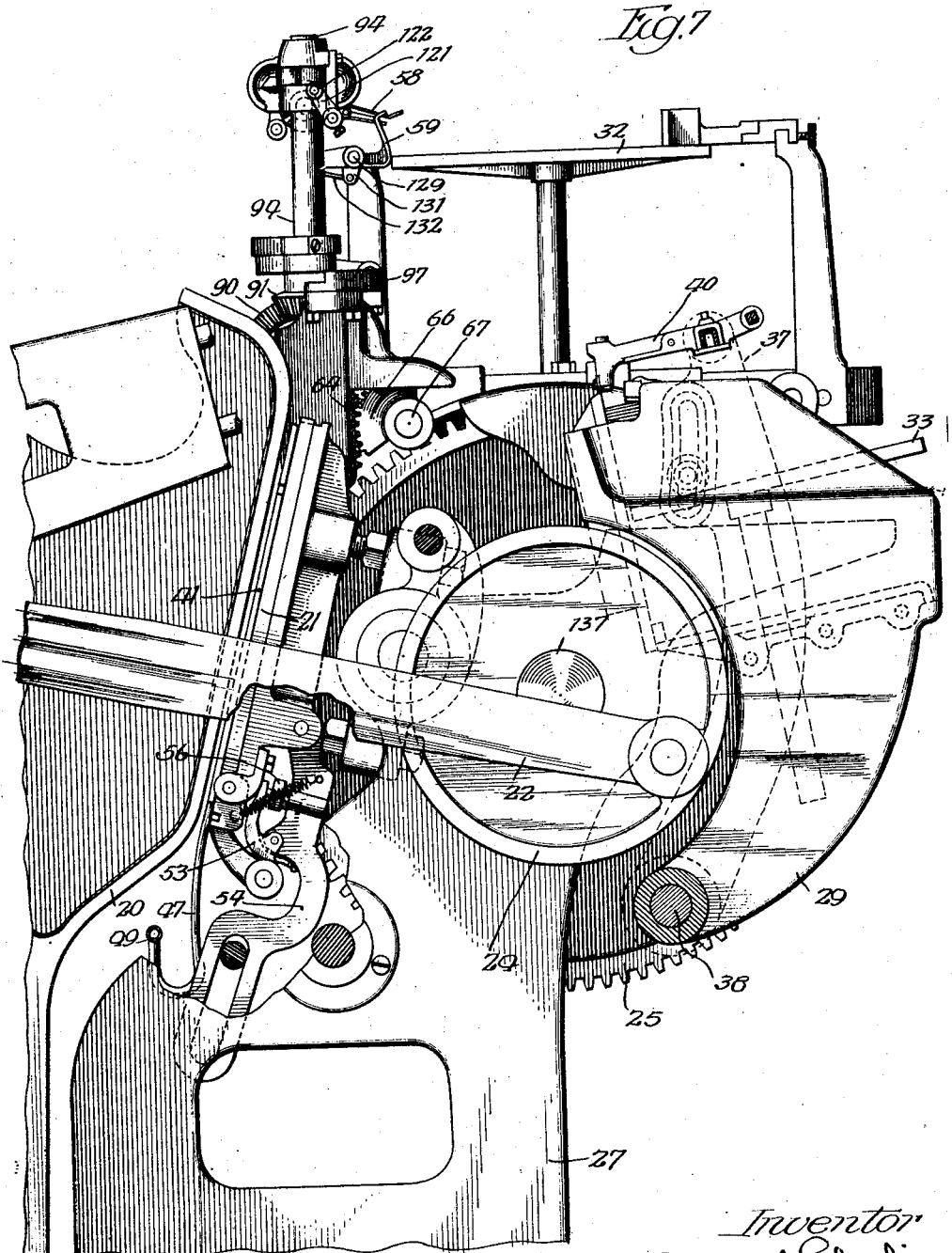
Fig. 7 is a sectional side elevation, the section being taken on the line 7—7 of Figure 5.
Figure 8:
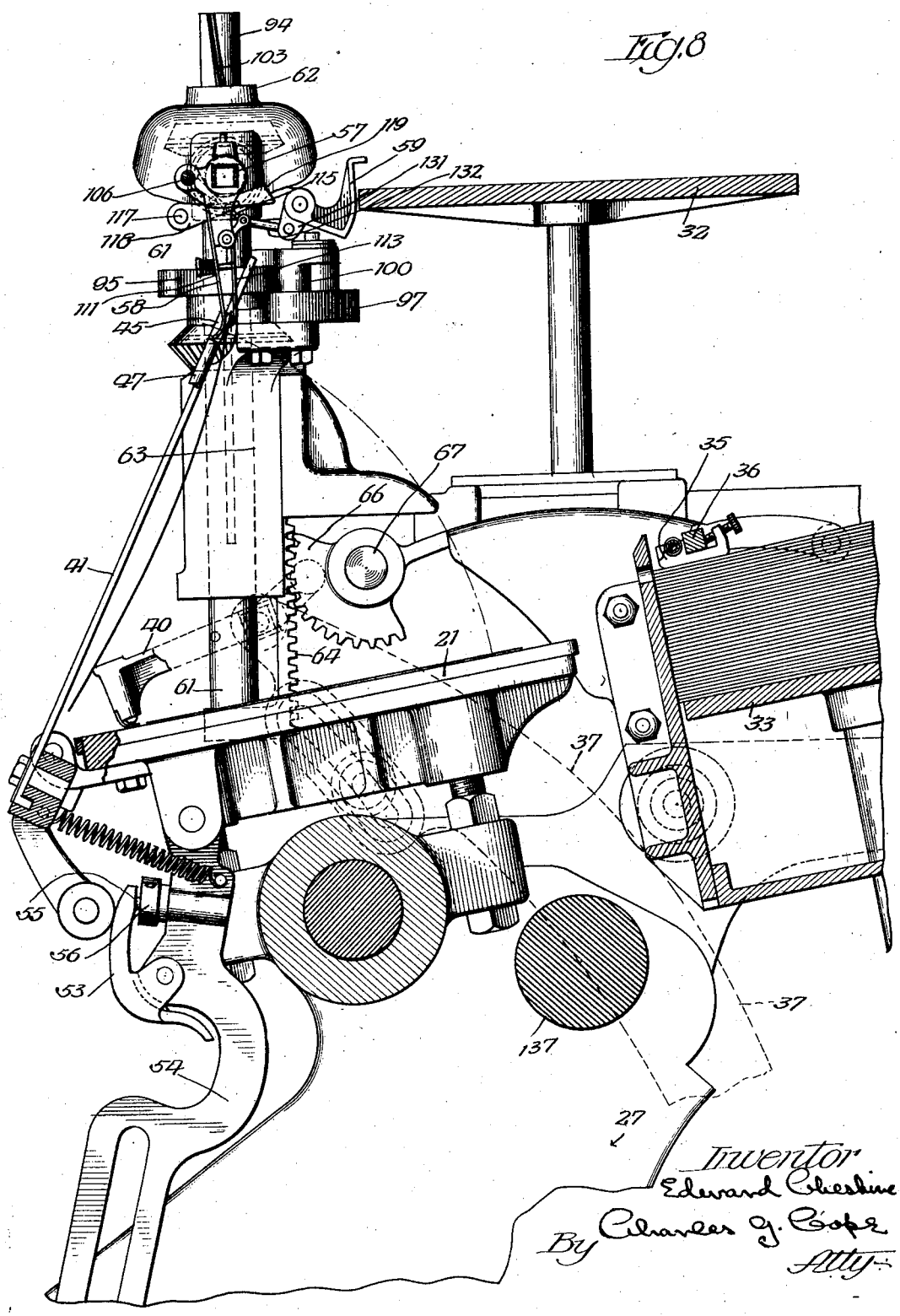
Fig. 8 is an enlarged sectional view looking from the left-hand side of the machine and showing the delivery grippers in the act of seizing a sheet.

To accommodate different conditions of operation of the carrying-away device, I have provided a means for adjusting the extent of movement of the grippers 41, so that they may be caused to bring the sheet to different final suspended positions, according to the dimensions, or position on the platen, of the particular sheet being printed. This is effected by means of an adjustable gripper cam 53 (Figs. 7 and 8). This adjustable cam 53 is pivoted upon the body of the original gripper cam 54 which is standard equipment as part of the well known Gordon press. Its upper end is engaged by a threaded pin carrying a nut 56. By turning the nut 56 in one direction or another, the upper end of the gripper cam 53 is moved inward or outward; and in this way the final open position of the upper end of the platen grippers is varied without affecting their closed position upon the platen. It will be seen that by this adjustment the sheet is permitted to be brought to varying positions of suspension, within narrow limits.

Figure 3:
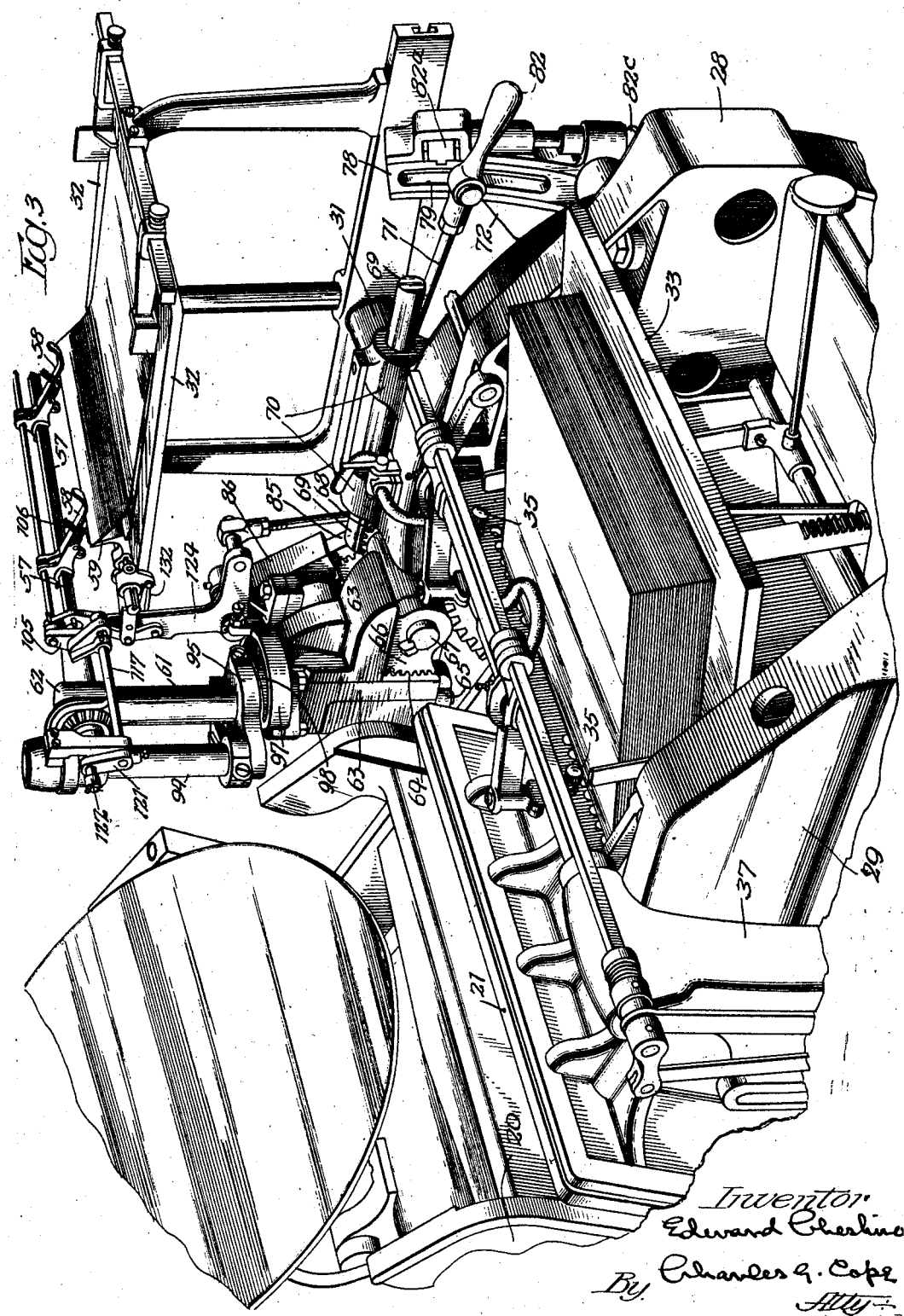
Fig. 3 is a view similar to Fig. 2 but showing the parts in a position where the delivery grippers have swung around through a half circle and are about to deposit the printed sheet upon the delivery table.

The carrying-away means comprises a delivery bar 57, having delivery grippers 58 adapted to close upon the sheet suspended from the suction feet of the platen grippers (Fig. 2) and swing the sheet over to a position for being dropped on the delivery table (Fig. 3). The delivery bar has a vertical movement, a swinging movement, and a rocking movement. From the position shown in Fig. 1, in which the delivery grippers are some distance above the position which would be occupied by the edge of the suspended sheet, the gripper bar descends vertically, and, at the same time, is slightly rocked, the effect being that the tips of the delivery grippers descend substantially along the inclined line of the platen grippers. The extent of this descending movement is adjustable, so that the delivery grippers can be made to go down more or less according to the height at which the sheet is suspended on the platen grippers. After the delivery bar has descended through such a distance that the delivery grippers can close upon the edge of the suspended sheet (Fig. 2), it rises again to its original vertical plane. As it rises, it begins to swing to the right, (see chain line, Fig. 4) carrying the sheet with it in the direction of the delivery table 32. During this swinging movement, the delivery bar is rocked on its axis, so as to bring its grippers 58 from the downwardly pointing position in which they seized the sheet to a nearly horizontal position suitable for laying the sheet onto the delivery pile. When the delivery bar has completed its swinging movement, and the edge of the sheet is about to engage stops 59 associated with the delivery table (Fig. 2), the grippers 58 are opened whereby the sheet is left on the delivery table in engagement with the stops 59. The delivery bar then returns to repeat the operation with another sheet. The delivery table 32 is so constructed as gradually to descend as the pile of printed sheets accumulate thereon, so that the top of this pile remains at a substantially constant level, giving a support in substantially a constant plane for each printed sheet to be delivered upon.

The vertical movement, above referred to, of the delivery bar 57 is effected as follows: The delivery bar is of square cross-section throughout the greater part of its length and is formed with a shaft extension 60 at its inner end, which extension is rotatably mounted in the top of a delivery post 61, and in a cap 62 carried by said post. The delivery post 61 is slidably and rotatably mounted in a bracket 63 at the forward part of the side frame member 28. A rack 64 is slidably mounted in ways formed in the bracket 63 and is provided with a forward extension 65 at its lower end, in which the post 61 is rotatably mounted. With the rack 64 engages a segment gear 66 mounted on a pinion shaft 67 rotatably carried by the brackets 63. At its opposite end, the shaft 67 carries a pinion 68, which is engaged by a rack bar 69 slidably mounted in bearings 70 on the side frame member 28. The rack bar 69 has connected to it a link 71 (Fig. 11) which is connected to a block 72, pivoted at 72ª to the side frame member 28. The block 72 also has pivoted to it a cam link 73 which connects with a second link 74 pivoted, at 74ª to the inside of the cam shaft housing 30. At the juncture of the cam links 73 and 74, a cam roll is provided, which engages in a cam groove 75 of the main cam 76 carried by the shaft 52. It will be seen that as the main cam 76 rotates, the block 72 will be caused to rock upon its pivot 72ª and that this will result in a reciprocating movement of the rack bar 69. This movement of the rack bar 69 effects, through the pinion 68 and segment gear 66, a corresponding vertical reciprocation of the rack 64 and the delivery post 61 rotatably mounted with respect to the latter.

As the descending movement of the delivery bar 57 is, in the construction now being described, required to be variable, in order that the delivery grippers may reach the required position with respect to the edge of the sheet suspended on the platen grippers, regardless of the height at which such sheet may be suspended, I have provided means for adjusting the extent of the descending movement of the delivery post 61. To effect this, the block 72 (Figs. 9ª and 11) is formed with an arc-shaped groove 77, this groove being curved on a circle the center of which is the axis on which the link 71 is connected to the rack bar 69, the curve being struck when the rack bar 69 is in the position in which the post 61 is at the upper extremity of its movement. In the groove 77 is mounted a correspondingly shaped slide 78, having an arc-shaped slot 79 formed therein. A pin 80 passes through the slot 79 and is secured to the handle 82 of the link 71 by means of a clamping nut 81. By loosening the nut 81, the link 71 may be shifted upward or downward in the slot 79. It will be noted that this will result in a greater or lesser downward movement of the delivery post 61, whilst maintaining the upward limit of travel of said post constant.

In order to provide a fine adjustment of the extent of downward movement of the delivery post 61, and enable such adjustment readily to be made while the machine is running, I form the slide 78 with a notch in which loosely fits an ear formed on a nut 82ª slidably mounted in the block 72. The nut 82ª receives an adjusting screw 82ᵇ provided with a thumb nut 82ᶜ. By manipulating the thumb nut 82ᶜ, the slide 78 may be moved a short distance in its groove 77, and thus a fine adjustment of the extent of downward movement of the delivery post may readily be obtained.

The swinging movement of the delivery bar 57 is effected by the following means: Mounted in a suitable bearing in the bracket 63 is a stud shaft 83 having secured to one end thereof the pinion 84. With this pinion engages an actuating rack 85 slidably mounted, at its top end, in a pivoted guide 86, and, at its lower end, between guide members 87 extending inwardly from the inside of the cam housing 30 (Figures 10 and 11). The rack 85 carries a cam roll 88 which engages in a cam groove 89 formed on the face of the main cam 76. By this means a reciprocating movement is imparted to the rack 85, resulting in a to and fro rocking movement of the stud shaft 83. Upon the end of the stud shaft 83 opposite to that which carries the pinion 84 is mounted a bevel gear 90 which meshes with a bevel pinion 91 feathered upon the delivery post 61. By this means, a to and fro rocking movement of the delivery post 61, and therefore the to and fro swinging movement of the delivery bar 57 is effected.

Figure 4:
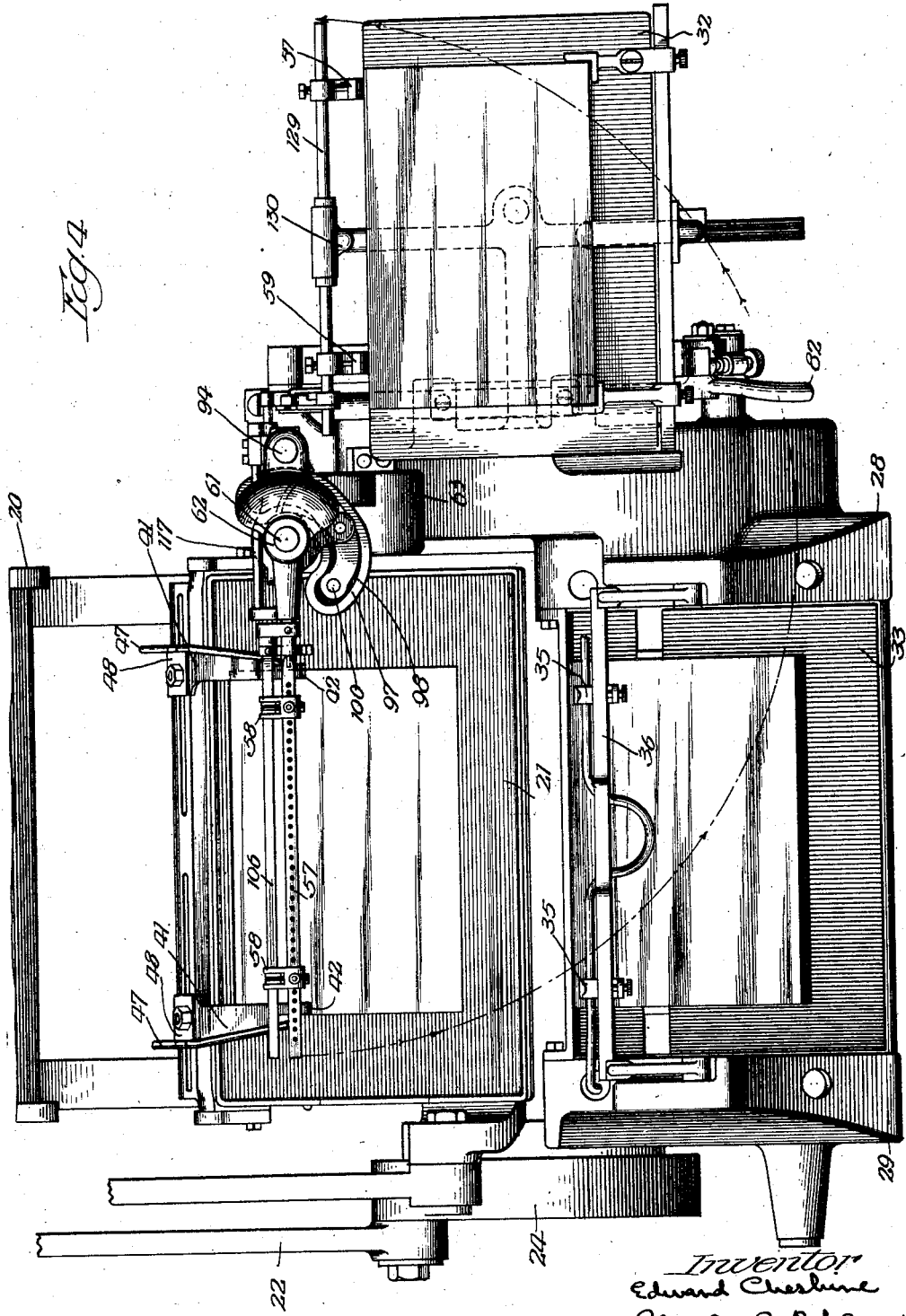
Fig. 4 is a plan of the mechanism.
Figure 5:
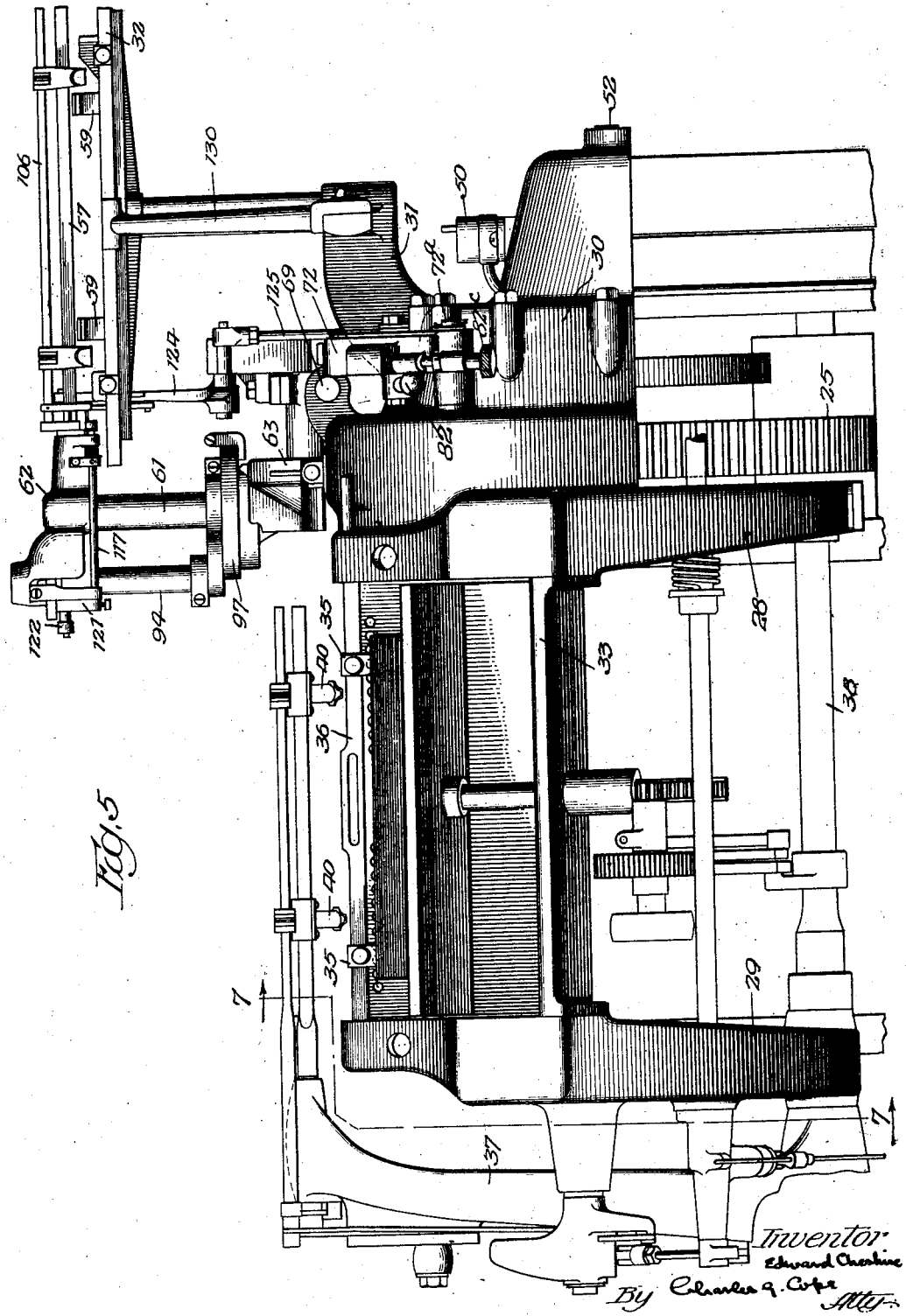
Fig. 5 is a front view of the mechanism, the delivery grippers being shown in the position which they assume when depositing a sheet upon the delivery table.
Figure 6:
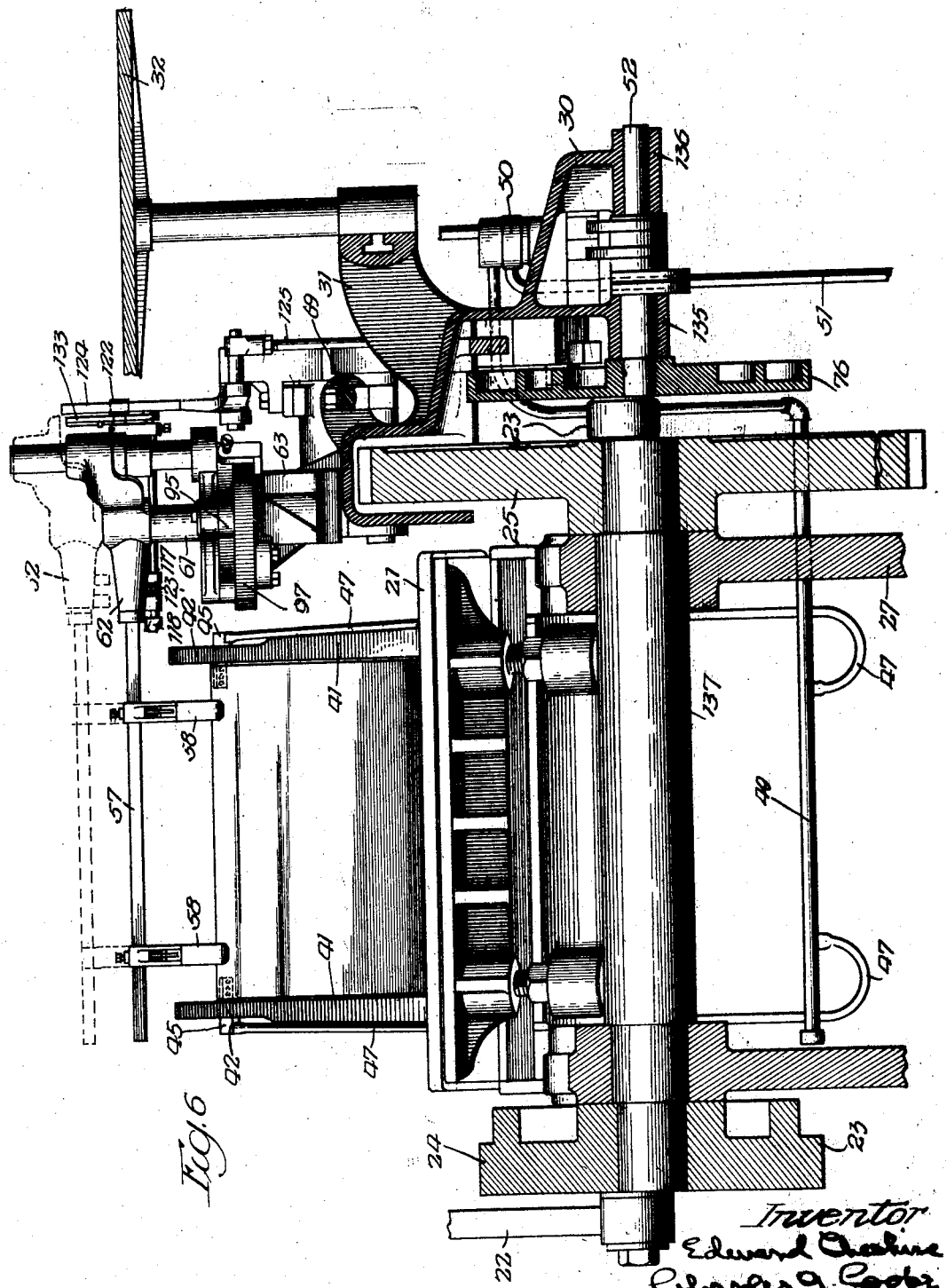
Fig. 6 is a sectional front view of the mechanism, the section being taken on the line 6—6 of Fig. 9, looking in the direction of the arrows, the delivery grippers being shown in the position which they assume when first gripping the printed sheet.

Two means are provided for rocking the delivery bar 57 about its axis,—one for rocking it to bring the delivery grippers from the downwardly pointing position in which they seize the sheet into the substantially horizontal position in which they deliver the sheet, and back, and the other for effecting the slight rocking of the delivery bar which causes the tips of its grippers 58 to travel downward in the inclined line of the platen grippers when the bar itself descends vertically. For effecting the rocking of the delivery bar to bring the grippers 58 from the downwardly pointing position to a substantially horizontal position, and back, there is secured to the end of the shaft extension 60 of the delivery bar a bevel pinion 92. With this pinion meshes a second bevel pinion 93 feathered upon a vertical shaft 94. The vertical shaft 94 is slidably and rotatably mounted, at its top end, in the cap 62 and is rotatably mounted, at its lower end, in a base member 95. The base member 95 surrounds the post 61, and is secured to a hub portion extending upwardly from the bevel pinion 91; so that the base member participates in the to and fro rotating movement of the delivery post. Secured by means of a stud 96 to the bracket 63, and surrounding the hub of the bevel pinion 91, so as to permit rotation of the latter therein, is a flat stationary cam 97, having in the upper face thereof a cam groove 98 (Figs. 3 and 4). Pivoted on the upper side of the base member 95 is a cam lever 99 carrying, at one end, a cam roll 100 which engages in the cam groove 98. At its other end, the cam lever 99 is formed with a gear quadrant 101 (Figs. 2 and 10) engaging a pinion 102 secured to the lower end of the vertical shaft 94. It will be seen that as the base member 95 rotates in one direction or the other with the delivery post 61, the cam roll 100, in following the cam groove 98 of the stationary cam 97, will cause the cam lever 99 to rock upon its pivot, and that this rocking movement, through the gear quadrant 101 and pinion 102, will cause a corresponding rocking about its axis of the vertical shaft 94. The rocking of the vertical shaft 94 is communicated through the bevel pinions 93 and 92 to the delivery bar 57. In this way, the delivery bar is caused to rock in a contra-clockwise direction as it swings from the position of seizing the printed sheet to the position of delivering it, thereby bringing the delivery grippers into a suitable, substantially horizontal position for dropping the sheet onto the delivery table.

For effecting the rocking of the delivery bar 57 during the descent of the latter, to cause the tips of the delivery grippers to travel in the inclined line of the platen grippers, the vertical shaft 94 is formed with a spiral keyway 103, and the feather key 104 of the bevel pinion 93 is made of spiral shape corresponding to the curve of the keyway. When the delivery post 61 descends, the cap 62 and bevel pinion 93 slide downward on the vertical shaft 94. The spiral shape of the keyway 103 causes a slight rotating movement of the bevel pinion 93 during this downward movement, thereby effecting the slight rocking of the delivery bar necessary for causing the tips of the delivery grippers to travel in the inclined line of the platen grippers carrying the suspended printed sheet.

In the machine now being described, the keyway 103 has, for manufacturing reasons, been made a pure spiral. This has been found to cause the path of the tips of the delivery grippers to approximate closely the inclined line of the platen grippers. It does not, however, cause the tips of the delivery grippers to follow this line exactly; and this is one of the reasons for the provision of the above described adjustment of the final position of the platen grippers.

The means for opening and closing the delivery grippers 58 is as follows: To the inner end of the delivery bar 57, near the cap 62, is secured an arm 105 in the outer end of which is rotatably mounted a gripper actuating rod 106. There are two of the delivery grippers 58 provided. Each includes a base 107 which is slidable upon the delivery bar 57 and may be secured thereon in any desired position by means of a pin 108 adapted to enter any one of a series of holes formed in the delivery bar (Figs. 12–14). From the base 107 extends a forked arm 109 which slides upon the gripper actuating rod 106. Also extending from the base 107 is a second forked arm 110 to which is secured the fixed gripper jaw 111. Pivoted between the sides of the forked arm 110 is a jaw lever 112 which has secured to it the movable gripper jaw 113. A pin secured to the movable jaw 113 passes through the fixed jaw 111 and is provided with a spring 114 which tends always to force the movable gripper jaw towards the fixed lower. The end of the jaw lever 112 is connected by a link 115 with an actuating lever 116 disposed in the forks of the arm 109 and feathered upon the gripper actuating rod 106. The arrangement of the levers 112 and 116 and the link 115 is such as to form a toggle, retaining the gripper in its closed or open condition until definitely operated. It will be noted that rotation of the actuating rod 106 in a clockwise direction (Fig. 13) causes the movable jaw 113 to be opened away from the fixed jaw 111, and that rotation in the opposite direction causes the gripper to be closed by the spring 114.

A shaft 117 is rotatably mounted in suitable bearings formed on the cap 62 and is provided at one end with an arm 118 situated immediately below a pin 120 carried by a tappet arm 119 secured to the gripper actuating rod 106. To the opposite end of the shaft 117 is secured a lever 121 carrying a roll 122. A spring 123 is provided which tends normally to maintain the arm 118 in a downward position, out of engagement with the pin 120 of the tappet arm 119. When the delivery grippers are to be closed, the roll 122 is engaged by the edge of a pivoted bell-crank lever 124, connected by a link 125 with a cam lever 126 (Fig. 9). The cam lever 126 carries a roll which is engaged by the cam 127 on the shaft 52. When the delivery grippers are to be closed, the delivery bar 57 will have swung around above the platen, and will have descended into a position in which the delivery grippers, then open, embrace the edge of the sheet suspended from the platen grippers. With the delivery bar in this position the lever 121 will be adjacent to the bell-crank lever 124. The cam 127 then effects a swinging movement of the bell crank lever 124 towards the right, whereby this member engages the roll 122 and moves the lever 121 so as to rock the shaft 117 and move the arm 118 upward. The arm 118 then strikes the pin 120 of the tappet arm 119, rocks the actuating rod 106, and allows the spring 114 to close the grippers 58.

The stops 59 against which the sheets are delivered, are mounted on a shaft 129 rotatably supported in a standard 130 disposed adjacent to the delivery table 32. The shaft 129 is provided with an arm 131 connected by a link 132 with the upper part of the bell crank lever 124, whereby the movements of the bell crank lever impart a rocking movement to the shaft 129, and thus to the stops 59. Upon the bell crank lever 124 is pivoted an arm 133 connected by a link 134 with the shaft 129. The arm 133 is located in the path followed by the tappet arm 119 on the gripper actuating rod 106 as the latter swings into the position in which the sheet is dropped onto the delivery table. At the time when the delivery bar has swung around over the delivery table and is just ready to drop the sheet (Figs. 9 and 11), the bell crank lever 124 will be moving towards the right. This movement, through the shaft 129 and lever 134, will cause a movement of the arm 133 towards the left. In such movement, the arm 133 will strike the end of the tappet arm 119 on the gripper actuating rod 106 and will cause said rod 106 to be rocked, thereby opening the grippers and allowing the sheet engaged against the stops 59 to drop upon the delivery table (Fig. 14). The delivery grippers 58 move slightly past the stops 59, thereby insuring that the delivered sheet engaging said stops shall drop into correct position on the pile of previously delivered sheets.

It will be noted that the above described carrying-away mechanism is actuated solely from the cams carried by the shaft 52. This shaft is supported in bearings 135 and 136 of the cam housing 30 and is disposed in accurate alignment with the main shaft 137 of the press. As an exceedingly simple means of driving the shaft 52, the main cam 76 is connected with the stud by which the right hand crank arm 23 of the press is connected with the press bull-wheel 25. In this way, the main cam 76 participates in the movement of the bull-wheel, and the shaft 52 is driven coincidentally with the main press shaft 137.

The operation of the sheet delivering device herein described is as follows: The suction feet 45 are first adjusted in position on the platen grippers 41 in accordance with the size and position of the sheet on the platen, so as to engage such sheet near its top edge. The delivery grippers 58 are then adjusted laterally on the delivery bar 57 so as to engage the sheet, when held in its suspended condition on the suction feet of the platen grippers, close to said suction feet. By means of the handle 82 on the link 71, said link is then adjusted so as to cause the delivery grippers to descend just low enough to seize the printed sheet in that position in which it is suspended on the platen grippers. A fine adjustment of this may be made, either in the beginning or when the press is running, by means of the thumb nut 82. If, in making the above adjustment for the extent of downward movement of delivery grippers, it is found that these grippers come to a point either slightly in front or slightly to the rear of the suspended sheet, the position of the platen grippers is changed by manipulating the nut 56 to move the adjustable cam 53. In this manner the mechanism is so adjusted that the delivery grippers, on their descent, will embrace with their jaws the suspended sheet at its top edge.

With the mechanism adjusted as above, the suction feet 45 on the platen grippers will attach themselves to the printed sheet as soon as suction is applied immediately after the printing operation. When thereafter the platen grippers swing up from the platen in the usual way, they will carry with them, suspended from the suction feet 45, the printed sheet, and bring it into a position for being seized by the delivery grippers 58. As the platen grippers assume this position, the delivery bar will descend to bring the grippers 58 (then open) into a position in which their jaws embrace the edge of the sheet. Thereupon the bell crank lever 124 operates the gripper actuating rod 106 to allow the springs 114 to close the grippers upon the sheet. At this time the valve 50 is actuated to cut off the suction and release the sheet from the feet 45 on the platen grippers. After this, the gripper rod rises again and at the same time starts to swing towards the delivery position shown in Fig. 3. It swings around until the tappet arm 119 of the gripper actuating rod 106 is engaged by the arm 133 on the bell crank lever 124, which arm 133 is then moving forward as above described. The arm 133 in its forward movement strikes the tappet arm 119 on the gripper actuating rod 106 thereby opening the delivery grippers and allowing the sheet to be deposited on the pile of previously printed sheets and in engagement with the stops 59.

Having thus fully described my invention what I claim as new and desire to secure by Letters Patent is:—

1. In a sheet delivery device for platen presses, means for moving the printed sheet from its position flat on the platen to a suspended position accessible for removal, and a gripping device for grasping the sheet in such suspended position and moving it to a place of deposition, said gripping device being movable substantially in the line of suspension of the sheet, and means for adjusting the extent of movement of said gripping device in such line.

2. The combination with the platen of a press, of a member associated therewith and movable from a position substantially parallel therewith to a position at an angle thereto, and a sheet grasping device associated with said member and adjustable lengthwise with respect thereto to accord with the position of the printed sheet on the platen.

3. The combination with the platen of a press, of a member associated therewith and movable from a position substantially parallel therewith to a position at an angle thereto, said member being adjustable laterally of the platen, and a sheet grasping device associated with said member and adjustable lengthwise with respect thereto, to accord with the position of the printed sheet on the platen.

4. The combination with the platen of a press, of a member associated therewith and movable from a position substantially parallel therewith to a position at an angle thereto, a sheet grasping device associated with said member and adjustable lengthwise with respect thereto to accord with the position of the printed sheet on the platen, whereby said device moves the printed sheet from its position flat on the platen to a position raised with respect thereto, means for receiving the sheet from said grasping device and removing it, and means for adjusting said removing means to accord with the position of adjustment of said grasping device.

5. The combination with the platen of a press, of a member associated therewith and movable from a position substantially parallel therewith to a position at an angle thereto, a sheet grasping device associated with said member and adjustable lengthwise with respect thereto, whereby the sheet is separated from the platen and moved to a raised position with respect thereto, a gripping device for receiving the sheet from said grasping device and removing it, means for moving said gripping device substantially along the line of said member when the latter is in its angular position with respect to the platen, means for adjusting the extent of movement of said gripping device along such line, and means for varying the angular position to which said member is moved, thereby to effect accurate cooperation between said gripper device and said grasping device.

6. In a device for delivering sheets from the platen of a press, a device associated with the platen for grasping a sheet, means for moving said device into cooperative relation with a sheet upon the platen prior to the printing operation, and for moving said device away from the platen after the printing operation, thereby to separate the printed sheet from the platen.

7. The combination with a press platen having a platen gripper, a sheet grasping device associated with said gripper to seize the printed sheet and raise it with the gripper after the printing operation.

8. In a sheet delivery device for platen presses, sheet grasping devices associated with the platen grippers, and means for actuating said devices to cause the printed sheet to be lifted thereby when the grippers rise from the platen after the printing operation.

9. In a sheet delivery device for platen presses, sheet grasping devices associated with the platen grippers, means for actuating said devices to cause them to carry the sheet with the platen grippers when the latter rise from the platen, and means for receiving the sheet from said devices and removing it.

10. In a sheet delivery device for platen presses, sheet grasping devices associated with the platen grippers and adjustable lengthwise with respect thereto, means for actuating said devices so as to carry the printed sheet with the platen grippers when the latter rise from the platen, means for removing the sheet from said devices, and means for adjusting said removing means to accord with the adjustment of said devices.

11. In a sheet delivery device for platen presses, sheet grasping devices associated with the platen grippers and adjustable lengthwise with respect to the latter, means for actuating said devices to carry the printed sheet with the grippers when the latter rise from the platen, a sheet-gripper for receiving the printed sheet from said devices, means for moving said sheet-gripper substantially along the line of said platen grippers when the latter are raised, means for adjusting the extent of such movement of said sheet-gripper, and means for adjusting the extent to which said platen grippers rise from the platen.

12. A sheet delivery device for platen presses comprising means for raising the printed sheet to a suspended position with respect to the platen, a sheet-gripper, means for swinging said gripper to and from a position substantially above the suspended sheet, and means for imparting a dipping movement to said gripper towards such sheet.

13. A sheet delivery device for platen presses comprising means for raising the printed sheet to a suspended position with respect to the platen, a sheet-gripper, means for swinging said gripper on a substantially vertical axis to and from a position substantially above the suspended sheet, and means for imparting a dipping movement to said gripper towards such sheet.

14. In a sheet delivery device for platen press comprising means for raising the printed sheet to a suspended position with respect to the platen, a sheet-gripper, means for swinging said gripper to and from a position substantially above the suspended sheet, means for imparting a dipping movement to said gripper towards the sheet, and means for rocking said gripper during such dipping movement to cause it to follow substantially the line of the suspended sheet.

15. A sheet delivery device for platen presses comprising means for raising the printed sheet to a suspended position with respect to the platen, a delivery bar, a sheet-gripper carried thereby, means for swinging said bar about a substantially vertical axis towards and from a position substantially above the suspended sheet, and means for imparting a dipping movement to said bar.

16. A sheet delivery device for platen presses comprising means for raising the printed sheet to a suspended position with respect to the platen, a delivery bar, a sheet gripper carried thereby, means for swinging said bar about a substantially vertical axis towards and from a position substantially above the suspended sheet, means for imparting a dipping movement to said bar, and means for rocking said bar during such dipping movement to cause said gripper to substantially follow the line of the suspended sheet.

17. A sheet delivery device for platen presses comprising sheet grasping devices associated with the platen grippers to raise the printed sheet with the platen grippers when the latter rise from the platen, a sheet-gripper, means for swinging said sheet-gripper to and from a position above said platen grippers, and means for imparting a dipping movement to said sheet-gripper towards said grasping devices.

18. A sheet delivery device for platen presses comprising sheet grasping devices associated with the platen grippers to raise the printed sheet with the platen grippers when the latter rise from the platen, a sheet-gripper, means for swinging said sheet-gripper about a substantially vertical axis to and from a position substantially above said grasping devices, and means for imparting a dipping movement of said sheet-gripper towards said devices.

19. A sheet delivery device for platen press comprising sheet grasping devices associated with the platen grippers to raise the printed sheet with the platen grippers when the latter rise from the platen, a sheet-gripper, means for swinging said sheet-gripper about a substantially vertical axis to and from a position substantially above said gripping devices, means for imparting a dipping movement of said sheet-gripper towards said grasping devices, and means for rocking said sheet-gripper during such dipping movement to cause it to follow substantially the line of said platen grippers.

20. A sheet delivery device for platen presses comprising sheet grasping devices associated with the platen grippers, and adjustable lengthwise of the latter, to raise the printed sheet with the platen grippers when the latter rise from the platen, a sheet-gripper, means for swinging said sheet-gripper about a substantially vertical axis to and from a position substantially above said grasping devices, means for imparting a dipping movement of said sheet-gripper towards said devices, and means for adjusting the extent of the dipping movement of said sheet-gripper to accord with the adjustment of said sheet grasping devices.

21. A sheet delivery device for platen presses comprising sheet grasping devices associated with the platen grippers, and adjustable lengthwise of the latter, to raise the printed sheet with the platen grippers when the latter rise from the platen, a sheet gripper, means for swinging said sheet-gripper about a substantially vertical axis to and from a position substantially above said grasping devices, means for imparting a dipping movement of said sheet-gripper towards said devices, means for adjusting the extent of the dipping movement of said sheet-gripper to accord with the adjustment of said sheet grasping devices, and means for rocking said sheet-gripper during such dipping movement to cause it to follow substantially the line of said platen grippers.

22. A sheet delivery device for platen presses comprising means for raising the printed sheet to a suspended position with respect to the platen, a sheet gripper, means for swinging said gripper to and from a position substantially above the suspended sheet, means for moving the said gripper to and from a downwardly pointing position during such swinging movement.

23. A sheet delivery device for platen presses comprising means for raising the printed sheet to a suspended position with respect to the platen, a sheet gripper, means for swinging said gripper to and from a position substantially above the suspended sheet, means for imparting a dipping movement to said gripper towards such sheet, and means for moving said gripper to and from a downwardly pointing position during its movements.

24. A sheet delivery device for platen presses comprising means for raising the printed sheet to a suspended position with respect to the platen, a delivery bar, a sheet gripper carried by said bar, means for swinging said delivery bar to and from a position in which said sheet gripper is substantially above the suspended sheet, and means for rocking said bar during such swinging movement to cause said gripper to move to and from a downwardly pointing position.

25. A sheet delivery device for platen presses comprising means for raising the printed sheet to a suspended position with respect to the platen, a delivery bar, a sheet gripper carried by said bar, means for swinging said bar to and from a position in which said gripper is substantially above the suspended sheet, means for imparting a dipping movement to said bar towards said sheet, and means for effecting a rocking movement of said bar to cause said gripper to move to and from a downwardly pointing position.

26. A sheet delivery device for platen presses comprising means for raising the printed sheet to a suspended position with respect to the platen, a delivery table, a delivery bar, a sheet gripper carried by said bar, means for swinging said delivery bar in a substantially horizontal plane to move said gripper from a position substantially above the suspended sheet to a position above said delivery table, and means for rocking said bar during such swinging movement to cause said gripper to move from a downwardly pointing position to a position substantially parallel with said delivery table.

27. A sheet delivery device for platen presses comprising means for raising the printed sheet to a suspended position with respect to the platen, a delivery table, a sheet-gripper, a delivery bar carrying said sheet-gripper, means for swinging said delivery bar in a substantially horizontal plane from a position substantially above the suspended sheet to a position above the delivery table, means for effecting a dipping movement of said delivery bar towards the suspended sheet, and means for rocking said bar during its movements to cause said sheet gripper to move from a downwardly pointing position to a substantially horizontal position.

28. A sheet delivery device for platen presses comprising sheet gripping devices associated with the platen grippers, and adjustable lengthwise of the latter, to raise the printed sheet with the platen grippers when the latter rise from the platen, a sheet gripper, a delivery bar carrying said sheet gripper, means for swinging said bar to and from a position substantially above said sheet gripping devices, means for imparting a dipping movement of said bar towards said devices, means for adjusting the extent of said dipping movement to accord with the adjustment of said devices, and means for rocking said bar during the movements of the latter to cause said sheet gripper to move to and from a downwardly pointing position.

29. A sheet delivery device for platen presses comprising sheet grasping devices associated with the platen grippers, and adjustable lengthwise of the latter, to raise the printed sheet with the platen grippers when the latter rise from the platen, a sheet-gripper, means for swinging said sheet-gripper to and from a position substantially above said gripping devices, means for imparting a downward movement to said gripper towards said devices, means for rocking said gripper during said downward movement to cause it to follow substantially the line of said platen grippers, and means for rocking said gripper from and to a downwardly pointing position.

30. A sheet delivery device for platen presses comprising sheet grasping devices associated with the platen grippers, and adjustable lengthwise of the latter, to raise the printed sheet with the platen grippers when the latter rise from the platen, a delivery table, a sheet-gripper, a delivery bar carrying said sheet-gripper, means for swinging said bar between said table and a position substantially above the said grasping devices, means for imparting a downward movement to said bar, means for rocking said bar during such downward movement, thereby to cause said gripper substantially to follow the line of said platen grippers, and means for rocking said bar during its swinging movement to cause said gripper to move from a downwardly pointing position in which it seizes the sheet to a substantially horizontal position in which it deposits the sheet upon said delivery table.

EDWARD CHESHIRE.